US008709367B2

(12) United States Patent
Pinard Westendorf et al.

(10) Patent No.: US 8,709,367 B2
(45) Date of Patent: Apr. 29, 2014

(54) CARBON DIOXIDE CAPTURE SYSTEM AND METHODS OF CAPTURING CARBON DIOXIDE

(75) Inventors: Tiffany Elizabeth Pinard Westendorf, Troy, NY (US); Sarah Elizabeth Genovese, Delmar, NY (US); Teresa Grocela-Rocha, Clifton Park, NY (US); Robert James Perry, Niskayuna, NY (US); Benjamin Rue Wood, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 606 days.

(21) Appl. No.: 12/847,562

(22) Filed: Jul. 30, 2010

(65) Prior Publication Data
US 2012/0027663 A1 Feb. 2, 2012

(51) Int. Cl.
*B01D 53/62* (2006.01)

(52) U.S. Cl.
USPC .......................................... 423/228

(58) Field of Classification Search
USPC .......... 422/168, 235, 611, 208, 242; 423/220, 423/226, 227, 228, 229
See application file for complete search history.

(56) References Cited

U.S. PATENT DOCUMENTS

| | | | |
|---|---|---|---|
| 4,129,739 A | 12/1978 | Tracy et al. |
| 4,162,280 A | 7/1979 | Kranz |
| 4,198,386 A | 4/1980 | Laslo et al. |
| 4,405,579 A | 9/1983 | Sartori et al. |
| 4,406,867 A | 9/1983 | Marcinkowsky et al. |
| 4,487,833 A | 12/1984 | Donahoe et al. |
| 5,939,574 A | 8/1999 | Schilling, Jr. et al. |
| 6,117,995 A | 9/2000 | Zedda et al. |

(Continued)

FOREIGN PATENT DOCUMENTS

| | | |
|---|---|---|
| EP | 0588175 A2 | 3/1994 |
| EP | 1074297 A2 | 2/2001 |

(Continued)

OTHER PUBLICATIONS

Kitchens, et al.; Reversible Gelation of Polyethyleneimine Solutions Using CO2; AIChE Annual Meeting, San Francisco, CA; 2006; Entry 520f of Proceedings; 2 Pages.

(Continued)

*Primary Examiner* — Jill Warden
*Assistant Examiner* — Joye L Woodard
(74) *Attorney, Agent, or Firm* — Francis T. Coppa

(57) ABSTRACT

In one embodiment, a system for recovering carbon dioxide can comprises: a reaction chamber having a first pressure and comprising a gas stream inlet; a phase-changing liquid sorbent, wherein the liquid sorbent is chemical reactive with carbon dioxide to form a solid material; a regeneration unit to decompose the solid material to released carbon dioxide gas and regenerated liquid sorbent; and a dry transport mechanism configured to transport the solid material from the reaction chamber at the first pressure to the regeneration unit at a second higher pressure. In one embodiment, a method of recovering carbon dioxide from a gas stream, comprises: chemically reacting carbon dioxide with a pure amine compound liquid sorbent to form a solid material; without adding a carrier fluid, dry pressurizing and transporting the solid material, to a regeneration unit; and heating the solid material in the regeneration unit to provide a substantially thermal reaction to decompose the solid material to carbon dioxide gas and regenerated liquid sorbent.

5 Claims, 3 Drawing Sheets

(56) References Cited

U.S. PATENT DOCUMENTS

| | | | |
|---|---|---|---|
| 6,352,576 B1 | 3/2002 | Spencer et al. | |
| 6,797,039 B2 | 9/2004 | Spencer | |
| 7,718,151 B1 * | 5/2010 | Hu | 423/220 |
| 7,842,126 B1 * | 11/2010 | Dilmore et al. | 423/225 |
| 7,927,403 B2 * | 4/2011 | Versteeg et al. | 423/228 |
| 2005/0129598 A1 | 6/2005 | Chinn et al. | |
| 2005/0160913 A1 | 7/2005 | Hrycak et al. | |
| 2009/0291874 A1 | 11/2009 | Bara et al. | |
| 2010/0154431 A1 | 6/2010 | Genovese et al. | |
| 2010/0154639 A1 | 6/2010 | Perry et al. | |
| 2010/0158777 A1 | 6/2010 | Perry et al. | |

FOREIGN PATENT DOCUMENTS

| | | |
|---|---|---|
| WO | 03095071 A1 | 11/2003 |
| WO | 2008072979 A1 | 6/2008 |
| WO | 2009126607 A4 | 10/2009 |
| WO | 2009153351 A1 | 12/2009 |
| WO | 2010054427 A1 | 5/2010 |

OTHER PUBLICATIONS

Occupational Safety and Health Administration; Remediation Technology Health and Safety Hazards: Thermal Desorption; SHIB Feb. 3, 2003; http://www.osha.gov/dts/shib/shib_02_03_03_tsds9.pdf; 14 Pages.

Yamada et al.; "Reversible, Room-Temperature Ionic Liquids. Amidinium Carbamates Derived from Amidines and Aliphatic Primary Amines with Carbon Dioxide"; Chem. Matter, vol. 19; Jan. 16, 2007; pp. 967-969.

Search Report and Written Opinion from corresponding EP Application No. 11175658.1213 dated Nov. 10, 2011.

U.S. Appl. No. 12/609,454, filed Oct. 30, 2009.

\* cited by examiner

CARBON DIOXIDE CAPTURE SYSTEM AND METHODS OF CAPTURING CARBON DIOXIDE

BACKGROUND

This disclosure generally relates to systems and processes for capturing carbon dioxide ($CO_2$) from gas streams, and more particularly to a solids delivery system to handle solid material containing the captured $CO_2$.

The emission of carbon dioxide into the atmosphere from industrial sources such as power plants is now considered to be a principal cause of the "greenhouse effect", which contributes to global warming. In response, efforts are underway to reduce emissions of $CO_2$. Many different processes have been developed to attempt to accomplish this task. Examples include polymer and inorganic membrane permeation; removal of $CO_2$ by adsorbents such as molecular sieves; cryogenic separation; and scrubbing with a solvent that is chemically reactive with $CO_2$, or which has a physical affinity for the gas.

One technique has received much attention for removing $CO_2$ from flue gas streams, e.g., exhaust gas produced at power plants. In this technique, aqueous monoethanolamine (MEA) or hindered amines like methyldiethanolamine (MDEA) and 2-amino-2-methyl-1-propanol (AMP) are employed as the solvents in an absorption/stripping type of regenerative process. The technique has been demonstrated commercially, using pilot plant and/or slipstream units, for $CO_2$ capture from coal-fired power plants and gas turbines. Commercial $CO_2$ capture has been practiced in gas sweetening processes for chemical production and in the food and beverage industry.

There are certainly considerable advantages inherent in the MEA and hindered amine-based absorption processes. However, a number of deficiencies may be preventing wider adoption of this type of technology. For example, the process can sometimes result in sharp increases in the viscosity of the liquid sorbent, which can cause decrease the mass transfer of $CO_2$ into the sorbent. To avoid this problem, the concentration of MEA and other amines is sometimes maintained at a relatively low level, e.g., below about 30 wt % in water, in the case of MEA. However, the lower concentrations can greatly reduce absorbing capacity, as compared to the theoretical capacity of the neat absorbent.

Moreover, energy consumption in the MEA process can be quite high, due in large part to the need for solvent (e.g., water) heating and evaporation. For example, the process may consume about 10-30% of the steam generated in a boiler that is heated by combustion of a fossil fuel. Furthermore, MEA-based absorption systems may not have the long-term thermal stability, in the presence of oxygen, in environments where regeneration temperatures typically reach at least about 120° C.

Additional drawbacks may result from the fact that the liquid sorbent which is enriched with $CO_2$ in the MEA or hindered amine process may still contain a substantial amount of free amine and solvent (usually water). The amine and water can be evaporated under typical operating conditions, and can cause corrosion and other degradation in the attendant equipment. To address this concern, specialized, corrosion-resistant materials can be used for the equipment, but this can in turn increase capital costs for the plant. In some cases, corrosion inhibitors can be added, but the use of these specialized additives can also increase operational costs.

Another example of a commercial $CO_2$ post-combustion capture process uses aqueous solutions of piperazine-promoted potassium carbonate ($K_2CO_3$). However, this process is often very energy-intensive, and can be economically inferior to the MEA process. Still another example involves the use of chilled ammonia. In this case, energy-intensive cooling systems are usually required for such a system, and the risks associated with unintended ammonia release may be unacceptable.

Therefore, there remains a need for systems that efficiently and effectively remove carbon dioxide from a gaseous stream.

SUMMARY

Disclosed herein is a carbon dioxide capture system and methods for using the same.

In one embodiment, a system for recovering carbon dioxide from a gas stream can comprise: a reaction chamber having a first pressure and comprising a gas stream inlet; a phase-changing liquid sorbent, wherein the liquid sorbent is chemically reactive with carbon dioxide to form a solid material; a regeneration unit at a second, higher pressure to decompose the solid material to release carbon dioxide gas and regenerate the liquid sorbent; and a dry transport mechanism configured to transport the solid material from the reaction chamber at the first pressure to the regeneration unit at a second higher pressure.

In one embodiment, a method of recovering carbon dioxide from a gas stream, comprises: chemically reacting carbon dioxide with a liquid sorbent to form a solid material; without adding a liquid carrier fluid, dry pressurizing and transporting the solid material to a regeneration unit; and heating the solid material in the regeneration unit to decompose the solid material to carbon dioxide gas and regenerated liquid sorbent.

The foregoing and other features of the present system and method will be further understood with reference to the drawings and detailed description.

DESCRIPTION OF THE FIGURES

Referring now to the figures, which are exemplary embodiments and wherein like elements are numbered alike.

DETAILED DESCRIPTION $CO_2$ sorbents can comprise liquid, nonaqueous $CO_2$-reactive material that is liquid through a large range of temperatures, is non-volatile, is thermally stable, and does not require a nonabsorbing carrier fluid or solvent. These liquid sorbents can solidify in the presence of $CO_2$. Disclosed herein are systems and methods for treating gas streams which contain $CO_2$ and which use these types of liquid sorbents. The system have would a method of pressurizing the solid $CO_2$-sorbent complex formed from the chemical reaction between the liquid sorbent and the $CO_2$. Moreover, the system includes a transportation mechanism for transporting the solid $CO_2$-sorbent complex to downstream components of the system, such as for treatment with related system equipment, e.g., regeneration units, and the like.

In capturing the $CO_2$ from the gas stream, the present system advantageously combines the use of a liquid sorbent that forms a solid in the presence of $CO_2$ and a dry solids pressurization system for handling the solid material and transporting it to a desorption unit or other downstream unit operation. The utilization of a dry solids pressurization system means no carrier fluid is required and hence the $CO_2$-containing solids and the liquid sorbent are not diluted. Not only does this allow the system size to be minimized, but it also saves the energy that would otherwise be required to pressurize the carrier fluid to create a high pressure desorption condition. Further, because the solids remain dry, there is no need to separate a carrier fluid from the $CO_2$ after the sorbent has been removed.

Carbon dioxide is present in a wide variety of gas streams that can be treated with the systems described herein. Non-limiting examples include gas streams originating from a combustion process; a gasification process; a landfill; a furnace (e.g., blast furnace or chemical reduction furnace); a steam generator; a boiler; and combinations comprising at least one of the foregoing. In one embodiment, the $CO_2$ gas stream is a flue stream originating in a coal-fired plant.

The system utilizes a liquid sorbent that chemically reacts with carbon dioxide present in the treatment stream (i.e., the stream to be treated) to form a new molecule that is a solid at the temperature and pressure of the reaction chamber. The solid material can then be transferred to a regeneration unit without the use of a fluid (e.g., no liquid carrier is needed to move the solid material to the regeneration unit). In the regeneration unit, release of the carbon dioxide and regeneration of the liquid sorbent can be performed under increased pressure (e.g., pressures of 1.1 to 30 bars). The carbon dioxide stream can then be sequestered or optionally be further processed. Also optionally, the liquid sorbent can be recycled to the reaction chamber.

Figure 1:
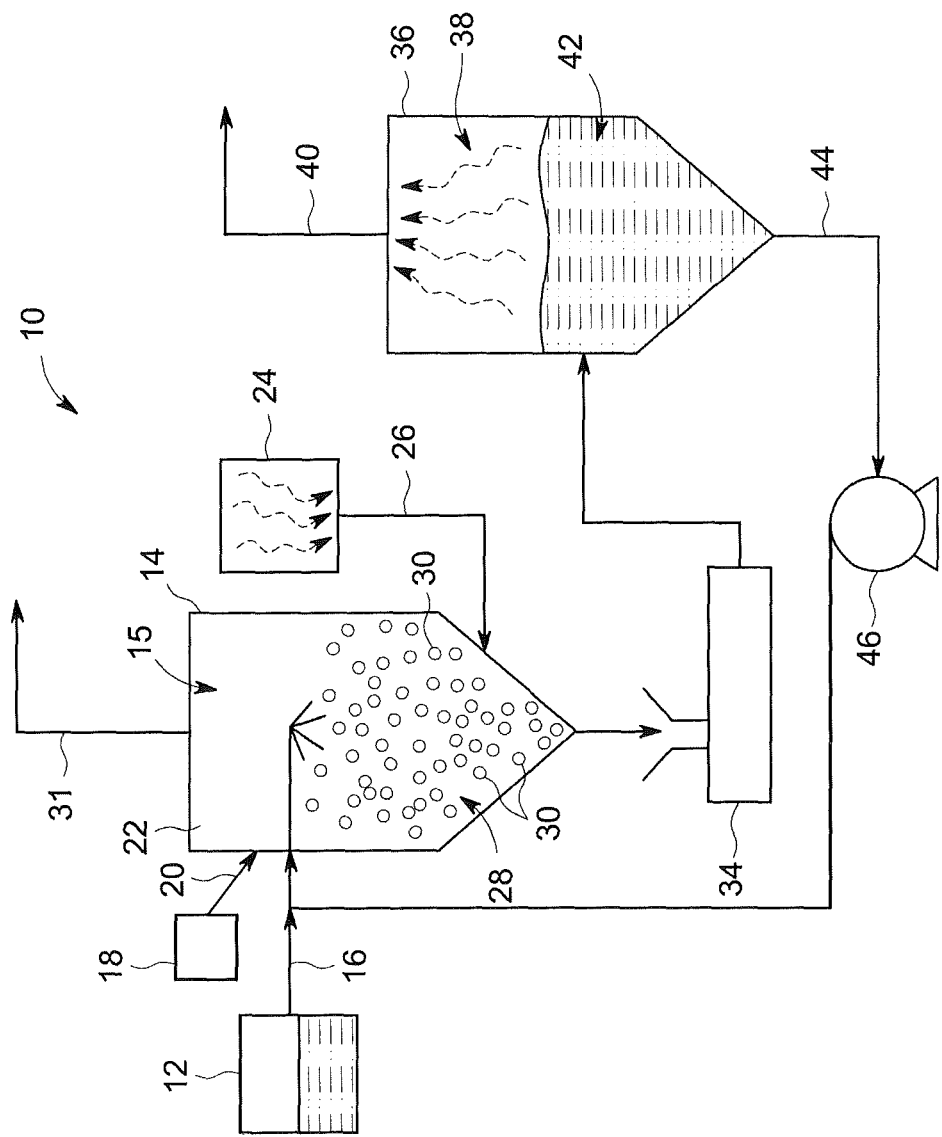
FIG. 1 is a schematic of an exemplary system for recovering $CO_2$ from a gas stream.

FIG. 1 is a schematic illustration of a system 10 configured to remove $CO_2$ from a gas stream. The liquid sorbent 12 is fed to a reaction chamber 14 via a conduit 16. In another embodiment, the liquid sorbent 12 can be fed to the reaction chamber 14 via a plurality of conduits to a plurality of locations within the reaction chamber 14. In the embodiment illustrated in FIG. 1, the supply point for the liquid sorbent 12 is located in an upper region 15 of reaction chamber 14, e.g., to provide sufficient contact time with the $CO_2$. The reaction chamber 14 is configured to provide contact of the liquid sorbent 12 with gas stream 24 (e.g. flue gas stream) such that reaction of the liquid sorbent with the $CO_2$ can occur.

The reaction of the liquid sorbent can be carried out in any large-scale chamber or enclosure that can be operated under the reaction conditions (e.g., temperature and pressure), and that enables the desired residence time. For example, the reaction chamber can be designed to allow for sufficient contact between the gas stream and the liquid sorbent, e.g. to maximize the reaction between the liquid sorbent and the $CO_2$. Exemplary reaction chambers for use in the system 10 can include, without limitation, an absorption tower, a wetted wall tower, a spray tower, a venturi scrubber, optionally equipped with an entrainment separator, and the like. Moreover, while a vertical chamber is depicted in FIG. 1, it is to be understood that a horizontally-oriented chamber might alternatively be used.

For example, a venturi scrubber (not shown in FIG. 1) typically includes multiple sections, e.g., a converging section, a throat section, and a diverging section. An inlet gas stream can enter the converging section, and as the area decreases, gas velocity increases. Liquids are usually introduced at the throat, or at the entrance to the converging section. In a typical scenario, the gas stream is forced to move at very high velocities in the small throat section, shearing the liquid matter from the vessel walls. This action can produce a large number of very tiny droplets, which can react with the gas stream.

In various embodiments, an atomizer 18 (e.g. orifice(s), spray nozzle(s), or the like) is disposed in fluid communication with the reaction chamber (e.g., located within the spray tower as illustrated in FIG. 1) to disperse the liquid sorbent 12 into droplets. For example, an atomizing gas (e.g., air) can be supplied from a nozzle tube 20 into the interior 22 of the reaction chamber 14. Alternatively, or in addition, the atomizer 18 can be designed to atomize the liquid sorbent due to the pressure of the reaction chamber and the size of the inlet from the atomizer 18 into the reaction chamber 14. The atomizer can be located near the exit of conduit 16 into the reaction chamber. In some embodiments, many nozzles may be placed across the tower at different heights, to maximize the number of the sorbent droplets, and/or the atomizer 18 can be incorporated into a portion of the conduit 16.

The selected size for the droplets of liquid sorbent will depend on various factors, such as the composition of the sorbent (e.g., the reactivity of the sorbent with $CO_2$ gas); and the type and design of the reaction chamber. The droplet size is a balance between maximizing the surface area for contact with the $CO_2$, and providing a sufficient mass for solid particle formation and preventing formed solid particles from being carried out of the reaction chamber in the gas stream. In an exemplary embodiment, such as when using a phase changing sorbent in the reaction chamber 14, the average diameter of the droplets can be less than or equal to 1,000 micrometers (μm). In another embodiment, for example when a venturi scrubber is used as the reaction chamber 14, the average diameter of the droplets can be 10 μm to 100 μm.

The gas stream 24 can be directed into reaction chamber 14 via conduit 26. In the embodiment illustrated by FIG. 1, the gas stream 24 is directed into a lower region 28 of the reaction chamber 14, relative to upper region 15. In this manner, an induced countercurrent flow exposes the gas stream, when it has the lowest $CO_2$ concentration, to the freshest liquid sorbent. At the same time, the gas stream with the highest $CO_2$ concentration is exposed to the most "converted" sorbent. This type of flow scheme can permit the resulting solid material to agglomerate more readily, leading to faster solidification.

The flow rate of the flue gas entering the reaction chamber is chosen to enable the desired $CO_2$ removal, e.g. to provide the residence time to reduce the $CO_2$ level in the gas stream to an acceptable level (e.g., less than or equal to 1.9 volume percent (vol %)). The inlet pressure will depend on the design and operating conditions of the reaction chamber as well as the type of atomizer. For example, the pressure drop for the gas stream entering the reaction chamber can be relatively small in the case of a spray tower (e.g., less than or equal to 150 inches of water), but may be larger for other types of reaction chambers.

The operating conditions of the reaction chamber are dependent upon the specific liquid sorbent utilized. Typical operating conditions for the absorber are 20° C. to 70° C. (specifically, 30° C. to 60° C., more specifically, 40° C. to 55° C.) at near-atmospheric pressure. Other factors affecting absorption performance include humidity, trace contaminants present in the flue gas, and the like.

As mentioned previously, the chemical reaction between the $CO_2$ in the gas stream and the liquid sorbent droplets results in the formation of solid particles 30. The size, shape, and density of the particles depend on various factors, such as the size of the initial droplets; the content of the liquid sorbent; the residence time within the reaction chamber; and the gas flow rate. Desirably, the particles 30 should be small enough to solidify to at least a non-sticky surface texture, but large enough to provide a sufficient mass for effective transport out of the reaction chamber 14. Generally, the solid material 30 is in the form of particles, e.g., spherical or substantially spherical in shape. The average particle density can vary significantly, but in an exemplary embodiment is in the range of about 1.1 grams per cubic centimeter (g/cc) to about 1.5 g/cc. The size of the particles can vary, e.g., depending on the initial spray technique used. Exemplary average particle sizes are similar to the droplet sizes, or less than or equal to 1,000 µm (not accounting for any agglomeration of individual particles).

Formation of the solid material 30 removes a substantial amount of $CO_2$ from the gas stream, e.g., in some embodiments, greater than or equal to 50% by volume (vol %); specifically greater than or equal to 70 vol %. The remaining $CO_2$-lean flue gas can then be released as an outlet gas, via conduit 31. Alternatively, the lean gas stream can be directed to another reaction vessel for additional treatment or use. The solid material 30 is then transported to a desorption vessel, e.g., to a regeneration unit via the use of a dry transport mechanism (i.e., no carrier liquid is added to move the solid material to the regeneration unit).

The solid particles 30 are transported to a regeneration unit (e.g., a desorber) by a dry transport mechanism 34 configured to pressurize and transport the solid particles without the addition of liquids (e.g., to dilute and/or pressurize the particles). The transport mechanism 34 represents a dry pressurization system configured to transport the particles to the desorption site. The transport mechanism 34 transports the solid particles 30 from the near-atmospheric reaction chamber 14 to the pressurized desorber 36.

The transport mechanism 34 can deliver the solid particles 30 to the regeneration unit 36 in a continuous or semi-continuous manner. Exemplary semi-continuous transport mechanisms for use in the dry pressurization and transport of the solid particles can include, without limitation, lockhoppers, piston pumps, and the like. Exemplary continuous transport mechanisms for use in the dry pressurization and transport of the solid particles can include, without limitation, solids pumps (e.g., the GE Posimetric™ pumps commercially available from General Electric Company), screw conveyors, and the like. Optionally, the solid particles can be transported using a combination comprising at least one of the foregoing transportation mechanisms. As described herein, the transport mechanism 34 utilizes dry pressurization methods such that a liquid carrier does not need to be added to the solid particles 30 in order to achieve the desired transportation or pressurization. These methods offer simpler, more efficient transport solutions over wet solids handling methods (e.g., pumpable slurries), because the volume of the system does not need to be expanded to accommodate carrier liquids, and because there is no need to separate the carrier liquid from the $CO_2$ after the sorbent has been regenerated.

Figure 2:
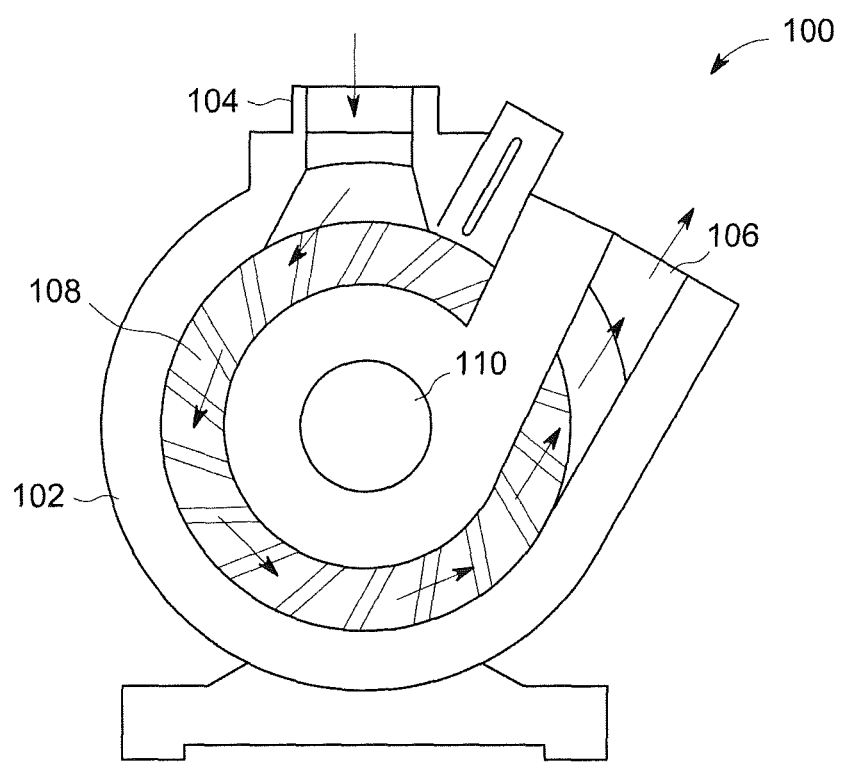
FIG. 2 is a schematic of an exemplary embodiment of a GE Posimetric™ solids pump for use as the transport mechanism of the system of FIG. 1.

In one embodiment, a solids pump is utilized in the system 10. An exemplary solids pump is a positive displacement Solids Transport and Metering pump utilizing GE Posimetric™ feed technology, otherwise known as a Posimetric™ solids pump, commercially available from GE Energy, Atlanta, Ga. FIG. 2 is a schematic illustration of an embodiment of a Posimetric™ solids pump 100. The solids pump 100 generally comprises a housing 102, an inlet 104 for the introduction of the solid particles 30, and an outlet 106 for discharge into the regeneration unit 36. The solids pump 100 further comprises a spool 108 mounted on a shaft 110, with the shaft 110 being rotatably mounted within a low-friction bearing assembly (not shown) for rotation about the shaft 110. The shaft 110 can be connected to a motor (e.g. hydrostatic or electrically-driven motor (not shown)). As the solid particles 30 are fed into the inlet 104, the material begins to fill up between the spool 108 and the interior of the housing 102. The spool 108 and the housing 102 define a transport channel between the inlet and outlet, with the spool rotating in a direction from the inlet toward the outlet.

In operation, the spool 108 is configured to rotate at a predetermined speed, and as it rotates the frictional forces between the solid particles and walls of the housing force the particles to compress against each other, thereby compressing the solid material within transport channel of the pump housing 102. Rotation of the spool 108 moves this compressed material through the housing 102 to the pump outlet 106. The outlet 106 can have any shape configured to correspond with an inlet of the regeneration unit 36 and in some cases may further include a die attached the outlet. As shown in FIG. 2, the outlet 106 can have an interior outlet channel which extends upward from the outlet of the transport channel and defines a cross-sectional area which diverges in the upward direction for holding, during operation of the pump, a mass of the compressed solid material so as to form a moving dynamic plug. The plug is effective in inhibiting fluid from entering the primary transport channel from the outlet. At the outlet 106, gas pressure from the high pressure environment of the regeneration unit 36 pushes against the compressed solid particles, but the moving dynamic plug forms a barrier that inhibits fluid from entering the pump 100 and the mechanical rotation of the spool 108 is able to push the solids against the pressure gradient created by the regeneration unit 36.

The Posimetric™ solids pump 100 does have certain advantages over some of the other transport mechanisms, such as, for example, the lockhopper and the piston pump. Unlike the solids pump 100, the lockhopper requires a carrier gas to pressurize the solids material 30 to the desired pressure. Moreover, the lockhopper is a semi-continuous mechanism, as only a fixed amount of the solid particles can be pressurized at a time. Once that fixed amount is pressurized and fed to the regeneration unit (e.g., desorber), the next amount can then be pressurized. Similarly, the piston pump also operates in a semi-continuous nature. While the piston pump generally does not require a pressurizing carrier gas, it does not operate continuously as the solids pump 100 does, because the piston cylinder has to fill with solids before it can be pressurized and pushed through the outlet of the pump as a compressed plug of solids. The piston cylinder is refilled and pressurized again before the next plug is passed through.

Figure 3:
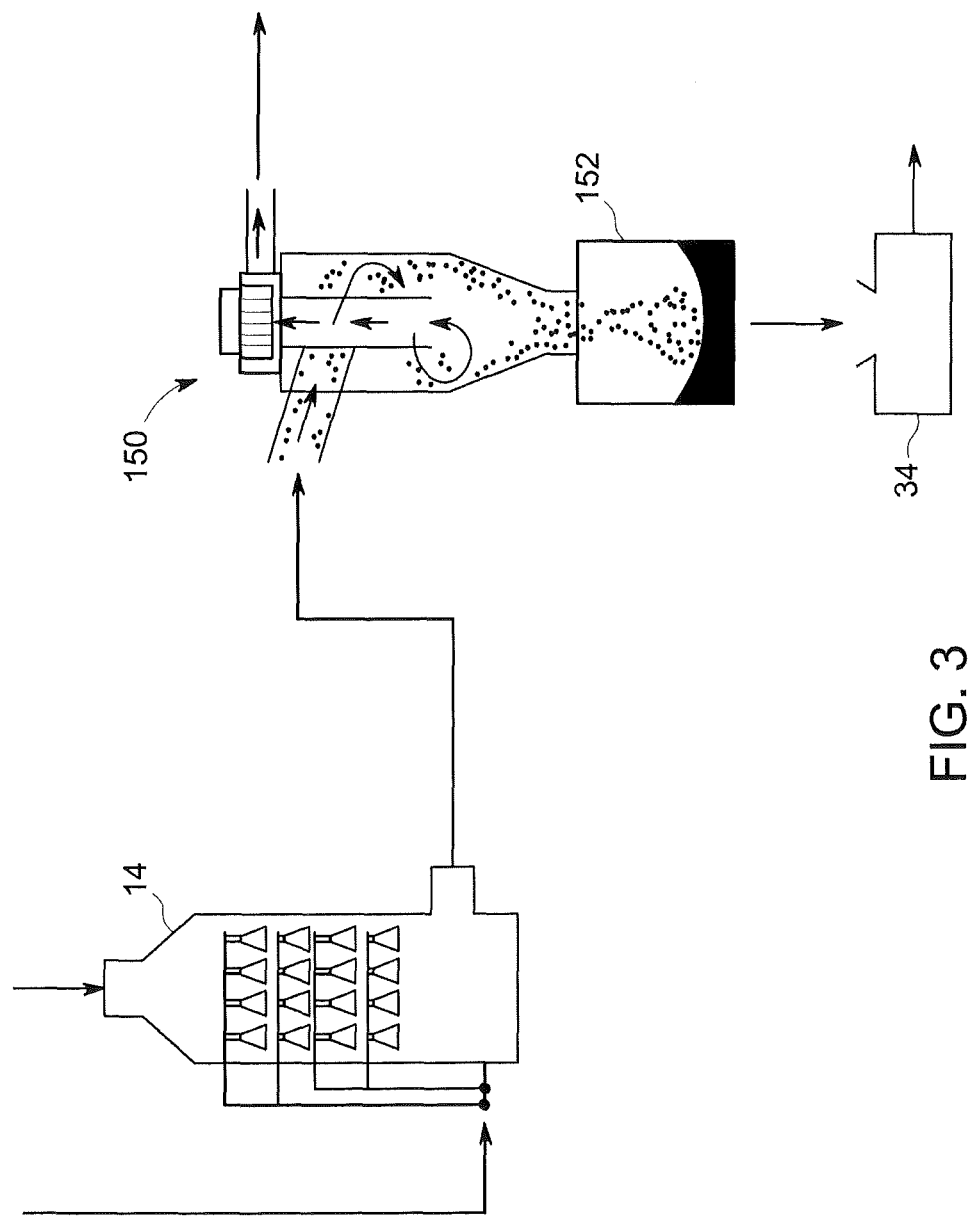
FIG. 3 is a schematic of the exemplary system of FIG. 1 including an optional cyclone for separating the scrubbed flue gas from the solid particles.

In some embodiments, the system 10 can further include an optional cyclone 150, as shown in FIG. 3. The cyclone 150 can be disposed between the reaction chamber 14 and the transport mechanism 34. The cyclone 150 is configured to separate the solid particles 30 from the "scrubbed" gas stream (i.e., the gas stream from which the $CO_2$ has been removed to the desired level (e.g., that is substantially free of $CO_2$)). The solid particles 30 fall to the bottom of the cyclone 150 where the material can empty into the transport mechanism 34, for example, via a hopper 152. The hopper 152 can then feed the inlet of the transport mechanism 34 (e.g., solids pump 100).

The solid particles 30, now pressurized by the transport mechanism 34, are directed to the regeneration unit 36. The regeneration unit 36 is configured to desorb the $CO_2$ from the particles 30 at high pressure, releasing $CO_2$ gas and regenerating the liquid sorbent. Since the transport mechanism pressurizes the solid particles 30 prior to delivery into the regeneration unit 36, the compression duty needed for sequestration of the $CO_2$ is reduced compared to a system that desorbs $CO_2$ at near-atmospheric pressure (e.g., an MEA-based system). In general, regeneration unit 36 is a vessel or chamber, which can provide varying heat and pressure conditions to liberate the $CO_2$ from the solid particles 30 and separate $CO_2$ gas from the regenerated liquid sorbent. Exemplary regeneration unit for use in the system 10 can include, without limitation, continuous stirred tank reactors (CSTR), and other like desorption vessels.

Desorption units are described in a number of references. One non-limiting example is the publication "Remediation Technology Health and Safety Hazards: Thermal Desorption", circulated by the Occupational Safety & Health Administration (OSHA); SHIB 02-03-03 (http://www.osha.gov/dts/shib/shib_02_03_03_tsds9.pdf). Many of the units are referred to as "thermal desorption units", which are designed to operate at relatively low temperatures, e.g., about 200° F. to 600° F. (93° C.-316° C.); or relatively high temperatures, e.g., about 600° F. to 1,000° F. (316° C.-538° C.).

In terms of applied temperature, thermal desorption units are often grouped into three process types: directly-heated units, indirectly-heated units; and in-situ units, as described in the OSHA reference. Moreover, the configuration of the unit can vary, e.g., depending on what type of solid material is being treated; and what temperature is required. In some instances, the desorption unit can be operated under a vacuum or very low pressure conditions; and/or low-oxygen conditions, e.g., to lower the heat requirements needed for desorption.

Generally, desorption of the solid particles 30 can be carried out by heating the particles. As alluded to previously, the heat-treatment regimen will depend on the composition and size of the solid particles; the amount of $CO_2$ bound within the particles; and pressure conditions within regeneration unit 36. Desirably, the temperature is high enough to release as much $CO_2$ as possible from the solid particles. Typically the temperature is greater than or equal to the decomposition temperature of the particles. However, the temperature should not be excessively high, i.e., requiring excessive energy use; or possibly resulting in decomposition of the sorbent to byproducts which may be difficult to handle in the overall process. Generally, the sorbent can be regenerated (e.g. the $CO_2$ can be released from the solid material while the solid material converts back to the liquid sorbent) under pressures of greater than or equal to 1 atm, specifically, greater than or equal to 2 atm, and more specifically, 10 to 20 atm. Desorption temperatures should be greater than 70° C. and less than the decomposition temperature of the liquid sorbent. For example, in most embodiments where the solid particles are carbamates, bicarbonates, or related compositions, the desorption temperature will be about 80° C. to about 150° C. In some embodiments, the internal pressure in the chamber of the regeneration unit 36 can be decreased, to accelerate the desorption process. Optionally, the pressure can be less than 1 atm.

Referring back to FIG. 1, the substantially pure $CO_2$ gas 38 is released or otherwise directed out of regeneration unit 36 by the conduit 40 (or multiple conduits). In an exemplary embodiment, the $CO_2$ gas is compressed and/or purified, e.g., for re-use, or for transport to a location.

The desorption step also functions to regenerate a substantial amount of the liquid sorbent 42. In some embodiments, the liquid sorbent can be directed to treatment, storage, or disposal facilities. However, in an exemplary embodiment, liquid sorbent 42 is directed back to reaction chamber 14, through one or more conduits 44. One or more pumps 46 can be used to pump the sorbent back to the reaction chamber. However, other techniques for moving the sorbent through appropriate piping can be envisioned by those skilled in the art.

The regenerated liquid sorbent 42 can be added by itself to the reaction chamber 14, to react with additional $CO_2$ from the gas stream, thereby forming more $CO_2$-bound solid material in a closed loop process. The regenerated liquid sorbent could also be combined with "fresh" liquid sorbent 12, or could be added to the reaction chamber 14 as a separate feed, along with sorbent 12. Moreover, the liquid sorbent could be combined with one or more chemically-reactive solvents for example, to absorb other trace contaminants present in the flue gas or to accelerate reaction of the primary sorbent with $CO_2$.

In some embodiments, the liquid sorbent can have a relatively low vapor pressure, (e.g., less than or equal to 0.2 millimeters of mercury (mmHg) at 20° C.). In other embodiments, the liquid sorbent can have a relatively high vapor pressure, and can be volatile under typical atmospheric conditions. In such embodiments, small droplets of regenerated sorbent may be carried out of the absorption and/or desorption chamber(s) with the gas flow. It may be desirable, therefore, in such embodiments to include at least one condensation step in the process. In this manner, additional sorbent may be recovered from the $CO_2$-rich gas stream, which results after decomposition of the solid $CO_2$-rich material, or from the $CO_2$-lean gas stream, which results after absorption of $CO_2$ from the raw flue gas. The condenser may be outfitted with any type of coolant system or device, e.g., cooling tubes or jackets, which utilize a variety of coolant fluids, such as water. Passage of the lean gas stream through the condenser serves to liquefy the residual sorbent, while also coalescing any small liquid droplets. The collected sorbent can then be directed, for example, to a storage vessel or recycled to the absorption vessel.

As mentioned above, a variety of liquid sorbents can be chemically reacted with the carbon dioxide. In general, any liquid $CO_2$ sorbent that can be converted to a solid by chemical reaction with carbon dioxide can be used to carry out the process described herein. Some materials (e.g., $CO_2$ hydrates and clathrates) have molecules that align in a cage structure to enclose the carbon dioxide, e.g., they rely solely upon an assembly of molecules and do not rely upon chemical reaction. The present liquid sorbent, however, is a phase-changing material that relies upon chemical reaction, and optionally physisorption, to remove the carbon dioxide, thereby forming a new molecule (e.g., forming new bonds). Some exemplary liquid sorbents are described in the following references: "Reversible Gelation of Polyethyleneimide Solutions Using $CO_2$", Kitchens et al, AIChE Annual Meeting, San Francisco, Calif., 2006 (p. 520f of proceedings); and "Reversible, Room-Temperature Chiral Ionic Liquids. Amidinium Carbamates Derived From Amidines And Aliphatic Primary Amines With Carbon Dioxide", Yamada et al, Chem. Mater., 19, (5), 967-969 (2007). The present phase-changing liquid sorbent can be a pure component (e.g., has no non-absorbing carrier or solvent). The sorbent can also rely upon a temperature swing process to facilitate the sorption and desorption of the $CO_2$.

In one embodiment, the liquid sorbent comprises at least one amine material. Various amine compounds (the term as used herein includes polymeric materials as well) can be used in the liquid sorbent. Many amines fall into the following classes: aliphatic primary and secondary amines, and polyamines; polyimines (e.g., polyalkyleneimines); cyclic amines, amidine compounds; hindered amines; amino-siloxane compounds; amino acids; and combinations comprising at least one of the foregoing. Non-limiting examples of these materials are noted below.

Exemplary aliphatic amines and polyamines include, without limitation, cyclohexyl amine, ethylenediamine, diethylenetriamine, triethylenetetramine, tetraethylenepentamine, 1,4-diaminobutane, 1,6-diaminohexane, 1,8-diaminooctane, and the like. Moreover, materials such as substituted amines, for example alkanolamines, may also be used.

Exemplary polyimines include, without limitation, polyalkyleneimines. These materials can be obtained by the polymerization of one or more alkyleneimines, such as ethyleneimine, propyleneimine, and 1,2-butyleneimine. In one embodiment, the polyimine is polyethylenimine.

Exemplary cyclic amines include, without limitation, piperidine, piperazine and pyridine-based compounds, such as 4-aminopyridine and morpholine. Various bicyclic compounds can also be used, such as 1,5-diazabiciclo[4.3.0]non-5-ene (DBN) or 1,8-diazabiciclo[5.4.0]undec-7ene (DBU).

A number of amidine and guanidine compounds may also be used. Most of amidines conform to the general structure:

$$RC(=NR)NR_2,$$

wherein each R group, individually, can be hydrogen or a lower alkyl group. Many of the amidine compounds are considered to be oxoacid derivatives (when the parent oxoacid is a carboxylic acid, the resulting amidine is a carboxamidine). Some of the exemplary amidine compounds are described in U.S. Pat. Nos. 4,162,280 (Kranz) and 4,129,739 (Tracy et al). A non-limiting example of the amidines can include, without limitation, formamidine (HC(=NH)NH$_2$).

Guanidines are a group of organic compounds with the general structure $(R_1R_2N)(R_3R_4N)C=N-R_5$, wherein each "R" group can independently be hydrogen or an alkyl group. Non-limiting examples of the guanidines include 1,1,3,3-tetramethylguanidine ((Me$_2$)N)$_2$C=NH).

Hindered amine compounds that may be used as the liquid sorbent are also known in the art. Some of examples of these compounds are described in U.S. Pat. No. 4,405,579 (Sartori et al) and U.S. Pat. No. 6,117,995 (Zedda et al), as well as EP Application 0588175B1 (Yoshida et al). Exemplary hindered amine compounds include, without limitation, polyalkyl-substituted piperidine derivatives, such as 2,2,6,6 tetramethyl piperidine. Other examples include, without limitation, 2,2,6,6-tetramethyl piperidine; tertbutylamine; cyclohexyldiamine; 2-(dimethylamino)-ethanol; 2-(diethylamino)-ethanol; 2(ethylmethylamino)-ethanol; 1-(dimethylamino)-ethanol; 1-(diethylamino)-ethanol; 1(ethylmethylamino)-ethanol; 2-(diisopropylamino)-ethanol; 1-(diethylamino)-2-propanol; 3-(diethylamino)-1-propanol; and combinations comprising at least one of the foregoing.

Various examples of amino-siloxane compositions are described in U.S. Pat. Nos. 5,939,574 (Schilling, Jr., et al) and 4,487,883 (Homan). Those skilled in the art will be able to determine which particular amino-siloxanes are capable of reacting with gaseous CO$_2$ to form the solid material, as described herein. Some of the amino-siloxanes which may be used are described in a pending U.S. patent application for Perry et al; U.S. application Ser. No. 12/512,105, filed on Jul. 30, 2009. A variety of amino-siloxanes are described in the referenced disclosure. Exemplary amino-siloxanes can include compositions which comprise chemical structure (I):

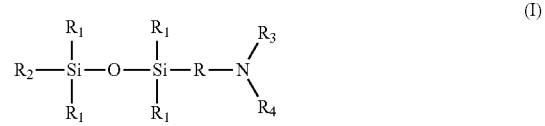

wherein R is a C$_1$-C$_6$ alkyl group, which can be linear or branched; and which can contain at least one hydroxy group; R$_1$ is independently at each occurrence C$_1$-C$_8$ alkyl or aryl; R$_2$ is R$_1$ or RNR$_3$R$_4$, wherein R$_3$ and R$_4$ are independently a bond, hydrogen, or C$_1$-C$_8$ alkyl (linear or branched).

One specific, illustrative example of an amino-siloxane compound is provided below as compound (Ia), wherein "Me" is a methyl group:

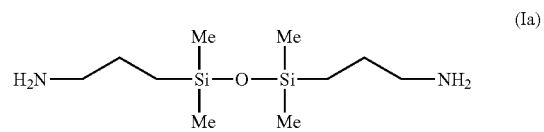 [SMILES: C[Si](C)(CCCN)O[Si](C)(C)CCCN]

The Perry et al application describes methods for preparing various amino-siloxane compounds as well.

The identity of the solid particulate that is formed by reaction of the liquid sorbent with the CO$_2$ will depend in large part on the specific liquid sorbent that is used. In the case of amine sorbents, the solid particulate will depend on the identity of the amine. In many instances, the solid particulate comprises a carbamate, a bicarbonate compound, or a combination comprising at least one of the foregoing; especially carbamate.

During use, a gas stream and a phase-changing liquid sorbent can be introduced to the reaction chamber. Within the reaction chamber, CO$_2$ in the gas stream and the liquid sorbent can chemically react to form a solid material and a lean gas stream (e.g., at a temperature of 20° C. to 80° C.). The product from the reaction chamber (e.g., the solid material and/or lean gas stream) can be directed to a separator (e.g., cyclone) that separates the solid material from the lean gas stream. The solid material is transported to the regeneration unit and is pressurized via the transport mechanism. Within the regeneration unit, the temperature of the solid material is adjusted (e.g., to 80 to 200° C.) to decompose the solid material to the CO$_2$ and the liquid sorbent. The liquid sorbent can optionally be recycled to the absorption chamber.

The transport mechanisms described above and configured to utilize dry solids pressurization can advantageously be used with the liquid CO$_2$ sorbents provided herein to effectively capture CO$_2$ for recycle in a manner that is more cost effective than current methods. Energy is saved by not being required to pressurize a liquid to create a high pressure desorption condition. Moreover, energy is further saved by then not having to separate said liquid pressurizing material from the CO$_2$ and regenerated liquid adsorbent. Still further, capital costs can be saved over those systems producing a liquid CO$_2$ adduct or utilizing pressurized liquids to create the high pressure desorption condition, because the volume and footprint of those systems will be much larger, requiring bigger equipment and taking up more space. As such, a method of reducing the carbon dioxide in a process stream is provided and comprises contacting the process stream with the liquid carbon dioxide sorbents described herein. The process stream so treated may be any wherein the level of CO$_2$ therein is desirably reduced, and in many processes, CO$_2$ is desirably reduced at least in the exhaust streams produced thereby. The process stream is typically gaseous but may contain solid or liquid particulates, and may be at a wide range of temperatures and pressures depending on the application. The solid particulates formed by the reaction of the liquid adsorbent with the carbon dioxide are pressurized in the absence of liquid. The pressurized solid particulates then undergo desorption to regenerate the liquid sorbent.

In one embodiment, a system for recovering carbon dioxide from a gas stream, comprises: a reaction chamber having a first pressure and comprising an gas stream inlet; a phase-changing liquid sorbent, wherein the liquid sorbent is chemically reactive with carbon dioxide to form a solid material; a regeneration unit (e.g., at a second, higher pressure) to decompose the solid material to release carbon dioxide gas and regenerate liquid sorbent; and a dry transport mechanism configured to transport the solid material from the reaction chamber at the first pressure to the regeneration unit at a second higher pressure.

Ranges disclosed herein are inclusive and combinable (e.g., ranges of "up to about 25 wt %, or, more specifically, about 5 wt % to about 20 wt %", is inclusive of the endpoints and all intermediate values of the ranges of "about 5 wt % to about 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of recovering carbon dioxide from a gas stream, comprising:
   chemically reacting carbon dioxide with a pure amine compound liquid sorbent to form a solid material;
   without adding a carrier fluid, dry pressurizing and transporting the solid material, to a regeneration unit; and
   heating the solid material in the regeneration unit to provide a substantially thermal reaction to decompose the solid material to carbon dioxide gas and regenerated liquid sorbent.

2. The method of claim 1, wherein dry pressurizing the solid material comprises compressing the solid material from a first pressure to a second pressure, wherein the second pressure is higher than the first pressure.

3. The method of claim 2, wherein the dry pressurizing and transporting the solid material further comprises moving the solid material in a transport channel formed by a housing and a spool of a solids pump upwardly through a diverging outlet so as to fill the outlet with the solid material.

4. The method of claim 3, further comprising directing the regenerated liquid sorbent back to a reaction chamber.

5. The method of claim 1, further comprising atomizing the liquid sorbent before the chemically reacting with the carbon dioxide.

* * * * *

UNITED STATES PATENT AND TRADEMARK OFFICE
CERTIFICATE OF CORRECTION

PATENT NO.       : 8,709,367 B2
APPLICATION NO.  : 12/847562
DATED            : April 29, 2014
INVENTOR(S)      : Tiffany Elizabeth Pinard Westendorf It is certified that error appears in the above-identified patent and that said Letters Patent is hereby corrected as shown below:

In Column 1, line 4 immediately following the title, and before the Background, please insert the following paragraphs:

--STATEMENT REGARDING FEDERALLY SPONSORED RESEARCH & DEVELOPMENT

This invention was made with Government support under grant number DE-NT0005310 awarded by the Department of Energy-NETL. The Government has certain rights in the invention.--

Signed and Sealed this
Ninth Day of August, 2016

Michelle K. Lee
*Director of the United States Patent and Trademark Office*